(12) United States Patent
Reiners et al.

(10) Patent No.: US 9,985,307 B2
(45) Date of Patent: May 29, 2018

(54) FUEL TREATMENT DEVICE

(75) Inventors: Karsten Reiners, Esslingen (DE);
Andreas Kaupert, Esslingen (DE)

(73) Assignee: Eberspaecher Climate Control Systems GmbH & Co. KG, Esslingen (DE)

( * ) Notice: Subject to any disclaimer, the term of this patent is extended or adjusted under 35 U.S.C. 154(b) by 1418 days.

(21) Appl. No.: 13/546,432

(22) Filed: Jul. 11, 2012

(65) Prior Publication Data

US 2016/0257565 A1 Sep. 8, 2016

(30) Foreign Application Priority Data

Jul. 12, 2011 (DE) .................. 10 2011 107 669

(51) Int. Cl.
| | |
|---|---|
| *C01B 3/16* | (2006.01) |
| *H01M 8/06* | (2016.01) |
| *C01B 3/56* | (2006.01) |
| *H01M 8/0612* | (2016.01) |
| *H01M 8/0662* | (2016.01) |
| *C01B 3/38* | (2006.01) |
| *B01J 19/24* | (2006.01) |

(52) U.S. Cl.
CPC ....... *H01M 8/0618* (2013.01); *B01J 19/2485* (2013.01); *C01B 3/16* (2013.01); *C01B 3/386* (2013.01); *C01B 3/56* (2013.01); *H01M 8/0625* (2013.01); *H01M 8/0675* (2013.01); *B01J 2219/2416* (2013.01); *B01J 2219/2428* (2013.01); *C01B 2203/0261* (2013.01); *C01B 2203/0283* (2013.01); *C01B 2203/0455* (2013.01); *C01B 2203/0485* (2013.01); *C01B 2203/066* (2013.01)

(58) Field of Classification Search
CPC ............... C01B 3/00; C01B 2203/045; C01B 2203/0455
See application file for complete search history.

(56) References Cited

U.S. PATENT DOCUMENTS

| | | | | |
|---|---|---|---|---|
| 7,303,598 | B1 * | 12/2007 | Namazian | ................. C01B 3/34 208/79 |
| 7,815,699 | B2 * | 10/2010 | Skala | ................... B01D 19/001 48/127.9 |
| 8,349,035 | B2 * | 1/2013 | Ahmed | .................... C01B 3/382 422/129 |
| 2002/0088740 | A1 * | 7/2002 | Krause | ................... B01J 8/0453 208/46 |
| 2002/0136936 | A1 | 9/2002 | Grieve et al. | |

(Continued)

FOREIGN PATENT DOCUMENTS

| | | |
|---|---|---|
| DE | 102 97 092 T5 | 8/2004 |
| DE | 602 07 767 T2 | 6/2006 |
| EP | 1 735 081 B1 | 1/2011 |

*Primary Examiner* — Matthew J Merkling
(74) *Attorney, Agent, or Firm* — McGlew and Tuttle, P.C.

(57) ABSTRACT

A fuel treatment device (2) converts a hydrocarbon-containing fuel into a fuel for a fuel cell (3). The fuel treatment device (2) has for this purpose a mixture formation space (7) for forming and processing a mixture of fuel and another component, a reformer (8) for converting the mixture into a synthesis gas and a desulfurization stage (9) for removing sulfur from the synthesis gas or from the mixture. The reformer (8) and desulfurization stage (9) are arranged adjacent to each other in a housing (10) along an axis of the housing (10).

20 Claims, 2 Drawing Sheets

(56) References Cited

U.S. PATENT DOCUMENTS

| | | | |
|---|---|---|---|
| 2002/0136939 A1* | 9/2002 | Grieve | B60L 11/1881 |
| | | | 429/415 |
| 2003/0031616 A1 | 2/2003 | Szydlowski et al. | |
| 2003/0087138 A1 | 5/2003 | Margiott et al. | |
| 2003/0188475 A1 | 10/2003 | Ahmed et al. | |
| 2004/0013917 A1 | 4/2004 | Ukai et al. | |
| 2004/0101471 A1* | 5/2004 | Petch | B01J 19/2485 |
| | | | 423/652 |
| 2004/0194384 A1* | 10/2004 | Nguyen | B01J 19/2485 |
| | | | 48/197 R |
| 2005/0089464 A1* | 4/2005 | Wang | B01J 12/007 |
| | | | 423/418.2 |
| 2006/0240296 A1 | 10/2006 | Grieve et al. | |
| 2007/0034551 A1 | 2/2007 | Lindström et al. | |
| 2008/0011646 A1 | 1/2008 | Giroux et al. | |
| 2008/0197323 A1* | 8/2008 | Farnell | B01J 23/464 |
| | | | 252/373 |
| 2010/0104897 A1* | 4/2010 | Bae | B01J 8/0465 |
| | | | 429/425 |
| 2010/0104899 A1* | 4/2010 | Bae | B01J 8/0465 |
| | | | 429/425 |
| 2010/0133473 A1 | 6/2010 | Serban et al. | |
| 2010/0254864 A1* | 10/2010 | Itsuki | B01J 19/2485 |
| | | | 422/629 |
| 2010/0323250 A1 | 12/2010 | Vanderspurt et al. | |
| 2011/0039686 A1 | 2/2011 | Li et al. | |
| 2011/0118105 A1 | 5/2011 | Schwank et al. | |
| 2012/0015259 A1* | 1/2012 | Budge | H01M 8/0675 |
| | | | 429/410 |
| 2012/0317833 A1* | 12/2012 | Hodoshima | C01B 3/38 |
| | | | 34/517 |
| 2014/0127597 A1* | 5/2014 | Harada | C01B 3/34 |
| | | | 429/423 |

\* cited by examiner

FUEL TREATMENT DEVICE

CROSS REFERENCE TO RELATED APPLICATIONS

This application claims the benefit of priority under 35 U.S.C. § 119 of German Patent Application DE 10 2011 107 669.9 filed Jul. 12, 2011.

FIELD OF THE INVENTION

The present invention pertains to a fuel treatment device for converting a hydrocarbon-containing fuel into a fuel for a fuel cell in a motor vehicle. The present invention pertains, in addition, to a process for operating the fuel treatment device as well as to a fuel cell system equipped with such a fuel treatment device.

BACKGROUND OF THE INVENTION

A burnable gas containing hydrogen and/or carbon monoxide or a fuel that can be fed to a fuel cell for generating electric current can be produced from a fuel commonly used to operate motor vehicles, for example, diesel fuel, biodiesel, gasoline or synthetic fuels, by the fuel being subjected to a reforming process.

A corresponding fuel treatment device usually has for this a mixture formation space for evaporating the fuel into a homogeneous reaction mixture in the gaseous or vapor form. The mixture formation space is designed, furthermore, to form a so-called "cold flame," in which a partial oxidation of the fuel takes place in a first process step. The fuel treatment device contains, furthermore, a reaction space with a catalyst designed, for example, as a coated monolith, or reformer, in which further conversion of the reaction mixture into reaction products, such as CO, $H_2$, $CO_2$, $N_2$ and $H_2O$, takes place.

Since the fuels used in motor vehicles contain, as a rule, a certain percentage of sulfur, the fuel treatment device is equipped, in addition, with desulfurization device or a desulfurization stage in order to counteract poisoning of the fuel cell or of the reformer by sulfur. Desulfurization of the fuel may be carried out, in principle, in front of the fuel treatment device, by desulfurization of the reaction mixture after the processing in the mixture formation space or by desulfurization of the synthesis gas after the reformer.

The above-mentioned assembly units of the fuel treatment device are usually designed as separate units, which are connected to one another via flow ducts. This is especially true of the desulfurization stages commonly used in the state of the art, because these are designed as replaceable components. This embodiment of a desulfurization device (stage) is represented, for example, by cartridges, which are filled with a carrier material consisting of a sulfur-adsorbing material, such as zinc oxide. If the absorption capacity of the zinc oxide for sulfur is reached, these desulfurization stages must be replaced with new ones, and they are therefore integrated in the fuel treatment device, as a rule, such that they are readily accessible and can be easily replaced.

Such a fuel treatment device is known, for example, from the document EP 1 735 081 B1. The drawback of the above-mentioned design is, however, that heat exchange can take place among the individual assembly units to a very limited extent only. Furthermore, fuel treatment devices of this design turn out to be relatively large and therefore also heavy, which is undesirable in light of the limited availability of useful space in mobile systems and leads, moreover, to a sluggish warm-up characteristic of the fuel treatment device.

Since each of the above-mentioned assembly units has an activation or working temperature, which is far above the ambient temperatures occurring (approximately 350° to) 950°), an external preheater is necessary for each of the assembly units at least during a restart of a fuel treatment device cooled to the ambient temperature. This causes, besides a considerable extra design effort, an additional installation volume as well as higher costs of the fuel treatment device.

SUMMARY OF THE INVENTION

One object of the present invention is therefore to provide a fuel treatment device that has no preheaters or has preheaters of the simplest possible design as well as a compact design and that can be manufactured and operated at a low cost, e.g., by eliminating the need for replaceable components.

According to the invention, a fuel treatment device is provided for converting a hydrocarbon-containing fuel into a fuel for a fuel cell. The fuel treatment device comprises a mixture formation space for forming and processing a mixture of fuel and another component, a reformer for converting the mixture into a synthesis gas, and a desulfurization stage (desulfurization manes/device) for removing sulfur from the synthesis gas or from the mixture. The reformer and the desulfurization stage are arranged adjacent to each other in a housing along a longitudinal axis of housing.

The present invention is based on the general idea of using chemical reactions taking place exothermally in individual assembly units for preheating the fuel treatment device before putting into operation or for heating other assembly units during the operation of the fuel treatment device in order to make it thus possible to fully eliminate external heaters in the ideal case. For example, the high temperatures (approximately 950°) developing in the reformer especially at the inlet-side end during the operation of the fuel treatment device can thus be used to evaporate the fuel fed in the mixture formation space. Furthermore, it is possible to design the desulfurization stage (desulfurization device) as a non-replaceable component. The sulfur collecting in the desulfurization stage must be removed in this case at regular intervals by regenerating the desulfurization stage. The chemical reactions that can be considered for such regeneration takes place highly exothermally. It is therefore possible to utilize the heat generated during a regeneration to preheat the entire fuel treatment device when putting the fuel treatment device into operation from a cold state.

Corresponding to an especially advantageous embodiment, the fuel treatment device for converting a hydrocarbon-containing fuel into a fuel for a fuel cell has a mixture formation space for forming and processing a mixture of fuel and another component, a reformer for converting the mixture into a synthesis gas and a desulfurization stage for removing sulfur from the synthesis gas or from the mixture, wherein said reformer and said desulfurization stage are arranged adjoining each other in a housing along an axis of the housing.

Due to the individual assembly units adjoining each other, very good heat exchange is possible between the assembly units. The heat generated in exothermal chemical processes in individual assembly units can thus be used to preheat or heat other assembly units during the operation of the fuel treatment device, as a result of which external preheaters can be eliminated. Furthermore, a small installation space and a comparatively low weight of the fuel treatment device can be achieved due to this arrangement, as a result of which rapid heating of the fuel treatment device is possible.

According to another advantageous embodiment of the fuel treatment device, the reformer and/or the desulfurization stage comprises a coated carrier body.

The fact that the reformer and/or the desulfurization stage is designed as a coated carrier body, for example as a coated ceramic monolith, makes possible a substantially better handling of the assembly units compared to designs in which a carrier material for a catalyst or for a sulfur-adsorbing material is present in the free-flowing form, e.g., as a granular material. In addition, it is possible for the individual assembly units or carrier materials to adjoin each other or be in contact with one another over large areas, as a result of which good heat transfer is possible.

Corresponding to another advantageous embodiment of the fuel treatment device, the reformer and the desulfurization stage have the same cross-sectional geometry.

This makes it possible to design a housing having a simple construction such that the two components are in contact by their jacket surfaces with the wall of the housing over a large area. As a result, good heat transfer can take place, on the other hand, over the wall of the housing between the two components. On the other hand, transitions that are favorable for flow are obtained during the exchange of gaseous substances between the individual assembly units, because no cross-sectional changes need to be compensated.

According to another advantageous embodiment of the fuel treatment device, the reformer and the desulfurization stage are integrated in a one-piece unit.

Due to the one-piece design, which can be embodied, for example, by a carrier body made of ceramic or metal, which is provided with different coatings at its opposite ends, the heat transfer between the functional units is further improved, on the one hand, and the inertia of the fuel treatment device during heating is reduced. On the other hand, the flow conditions between the individual assembly units are optimized and the handling of the entire system is improved due to the reduction in the number of components.

Corresponding to another advantageous embodiment of the fuel treatment device, the mixture formation space is arranged at the reformer or, adjoining the desulfurization stage, in a housing along an axis of the housing.

Due to the individual assembly units being arranged in series along an axis of a housing accommodating the assembly units, a very compact design can be obtained in a housing, which can have a simple shape. Furthermore, good evaporation of the fuel fed by the radiated or released heat of the reformer or of the desulfurization stage is possible due to the mixture formation space being directed towards the reformer or the desulfurization stage as well as due to the arrangement within the same housing.

According to another advantageous embodiment of the fuel treatment device, the reformer and/or the desulfurization stage has a coated metal carrier body.

Carrier bodies made of metal have a substantially greater strength and tolerance to mechanical stresses such as vibrations compared to carrier bodies made of ceramic. In addition, a very simple shape of the heater can be embedded in case of carrier bodies made of metal by applying an electric current to the carrier body. Heating of the carrier bodies can thus be achieved practically without additional components.

Furthermore, the good thermal conductivity of metal has a favorable effect on the chemical processes taking place in the carrier bodies.

Corresponding to another advantageous embodiment of the fuel treatment device, the reformer and/or the desulfurization stage has a coated metal carrier body with a corrugated structure.

Such a corrugated structure, which consists of at least one smooth film or plate and a corrugated film or a plate, which are joined together into a corrugated board-like structure and then rolled up into a cylinder, offers a simple solution for creating a structure through which flow is possible, offers a large surface and with which a fluid flowing through comes into contact, with basic bodies consisting of films or plates.

According to another embodiment of the fuel treatment device, the reformer and/or the desulfurization stage has a coated metal carrier body made of metal foam.

Compared to the above-described corrugated structure, metal carrier bodies made of metal foam can be manufactured in nearly any desired shape and are more cost-effective than the above-mentioned carriers with a corrugated structure. In addition, coating is no longer necessary, because the carrier body consisting of metal foam can be manufactured directly from a sulfur-adsorbing material, for example, nickel.

Corresponding to another advantageous embodiment of the fuel treatment device, the mixture formation space and/or the reformer and/or the desulfurization stage have an electric heater.

Compared to external, fuel-based heaters, electric heaters can be manufactured in a substantially simpler manner, can be substantially more compact and substantially more cost-effective.

According to another advantageous embodiment of the fuel treatment device, the desulfurization stage has an adsorbent for the adsorptive desulfurization of sulfur from the synthesis gas. The adsorptive desulfurization of sulfur can be used, contrary to other possible desulfurization processes, e.g., hydrodesulfurization, for both liquid and gaseous substances and takes place under much lower pressures. Furthermore, contrary to hydrodesulfurization, adsorptive desulfurization can also be used in case of such fuels as, e.g., biodiesel.

Corresponding to another advantageous embodiment, the fuel treatment device is provided in a fuel cell system, especially in a motor vehicle, where fuel produced by the fuel treatment device is fed as an anode gas to a fuel cell for generating electric current.

The present invention is especially suitable for use as an alternative to current generation in a vehicle by the conventional combustion of fuels in internal combustion engines in order to drive a current generator with this. The present invention also resorts to the fuels present in motor vehicles, and operation of the internal combustion engine at idle for the purpose of current generation is avoided and, in addition, higher efficiency can be achieved in current generation with a lower pollutant output.

According to an especially advantageous process for using the present invention, a hydrocarbon-containing fuel and another component are fed in a mixture formation space, a mixture is formed from the hydrocarbon-containing fuel and the other component and processed, the mixture is converted in a reformer into a synthesis gas, the sulfur is removed from the mixture or from the synthesis gas in a desulfurization stage, and the desulfurization stage is regenerated by removing the sulfur bound in the desulfurization stage to convert a hydrocarbon-containing fuel into a fuel for a fuel cell.

By regenerating the desulfurization stage, replacement of the desulfurization stage at regular intervals when the adsorption capacity of the adsorbent is reached can be eliminated. Furthermore, the heat generated during the exothermal regeneration reaction can be used to preheat or heat other assembly units, as a result of which external heaters can be eliminated.

Corresponding to another advantageous process for using the present invention to convert a hydrocarbon-containing fuel into a fuel for a fuel cell, an oxidant is fed to the desulfurization stage for regeneration.

Sulfur can thus be removed from the fuel treatment device via waste gas lines without individual assembly units having to be removed or without having to modify the fuel treatment device.

According to an especially advantageous process for using the present invention to convert a hydrocarbon-containing fuel into a fuel for a fuel cell, air and/or a gas mixture is fed to the desulfurization stage for regeneration, and the regeneration is controlled by varying the quantity of oxidant and/or fuel fed.

By controlling the regeneration by varying the quantity of fuel fed, of air fed as well as gas mixture fed, the heat generated and hence the temperatures occurring can be limited. Overheating of the individual assembly units can thus be prevented from occurring.

Corresponding to another advantageous process for using the present invention, regeneration of the desulfurization stage is carried out by removing the sulfur found in the desulfurization stage before feeding a hydrocarbon-containing fuel and another component into the mixture formation space.

If the fuel treatment device is put into operation when this has cooled to ambient temperature, the heat generated during regeneration can be used to preheat the entire fuel treatment device.

According to an especially advantageous process for using the present invention, regeneration of the desulfurization stage is carried out by removing the sulfur found in the desulfurization stage during the feeding of a hydrocarbon-containing fuel and another component into the mixture formation space.

By controlling the fed quantity of fuel, air and gas mixture, the reformer operating point can be shifted from a substoichiometric operation to a superstoichiometric operation. If a quantity of water fed into the mixture formation space is increased at the same time, regeneration of the desulfurization stage can also take place during the conversion of the hydrocarbon-containing fuel into a fuel for a fuel cell. Interruptions in the conversion of hydrocarbon-containing fuel into fuel, which would otherwise be necessary for regenerating the desulfurization stage, can be avoided as a result, and the fuel treatment device can be maintained at its operating temperature.

Corresponding to another advantageous process for using the present invention, regeneration of the desulfurization stage is carried out by removing the sulfur bound in the desulfurization stage after feeding a hydrocarbon-containing fuel and another component into the mixture formation space.

Regeneration of the desulfurization stage can also be carried out after the conversion of hydrocarbon-containing fuel into fuel for a fuel cell. The desulfurization stage can thus be fully regenerated again after the use of the fuel treatment device in order to guarantee the longest possible operating time during the subsequent operation.

According to an especially advantageous process for using the present invention, the heat generated during the reaction of the sulfur bound in the desulfurization stage with the oxidant is used to preheat the reformer and/or the mixture formation space.

External heaters are, as a rule, necessary for preheating the reformer to the operating thereof or an evaporator mat used to evaporate fuel. Additional heaters can be eliminated by using the heat generated during the exothermal chemical reactions in the fuel treatment device to preheat or heat assembly units of the fuel treatment device.

Corresponding to another advantageous process for using the present invention, the heat generated during the conversion of the hydrocarbon-containing fuel into a fuel for a fuel cell in the reformer is used to heat the mixture formation space or components of the mixture formation space intended to evaporate fuel.

An additional heater of components of the mixture formation space, which components are intended for evaporating fuel, for example, in an evaporator mat, can be eliminated in this manner.

Other features and advantages of the present invention appear from the following description of exemplary embodiments of the present invention on the basis of the figures, which show features essential for the present invention, and from the claims. The individual features may be embodied each individually or in any desired combination of a plurality of features in a variant of the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

Exemplary embodiments of the present invention are shown in the drawings and will be described in more detail in the following description. In the drawings.

DESCRIPTION OF THE PREFERRED EMBODIMENTS

Figure 1:
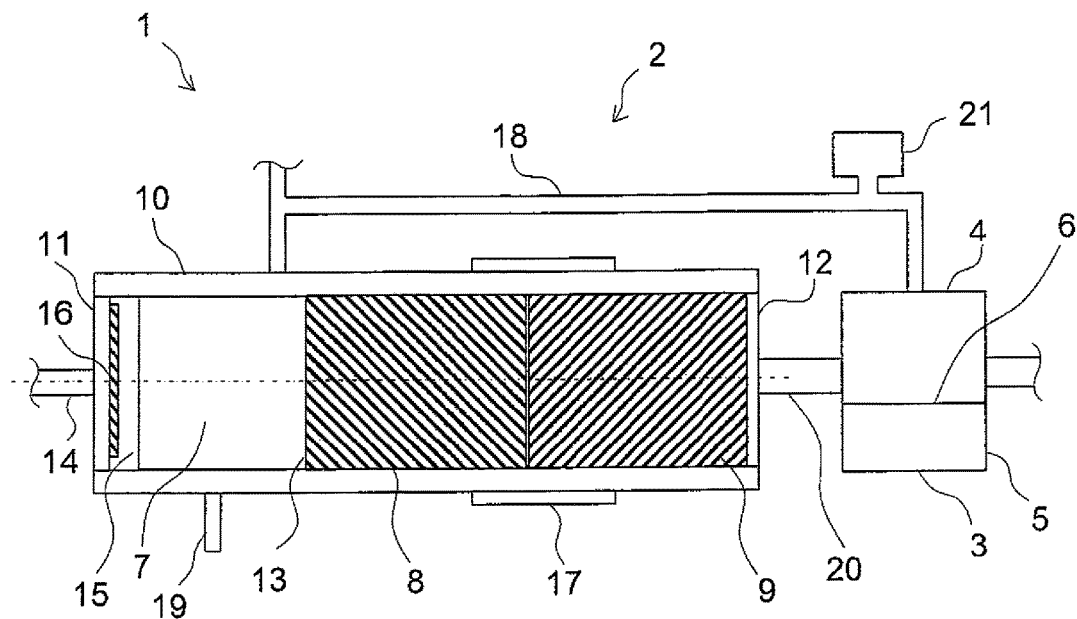
FIG. 1 is a schematic view of a first embodiment of a fuel cell system with a fuel treatment device and with a fuel cell.

Referring to the drawings in particular, a first embodiment of the present invention is shown in FIG. 1, which shows a fuel cell system 1, which is arranged in a motor vehicle (not shown) and comprises a fuel treatment device 2 and a fuel cell 3. Fuel cell 3 is used in the usual manner to generate current from a fuel or burnable gas containing hydrogen and/or carbon monoxide and an oxidant gas containing oxygen. The burnable gas is fed to an anode side 4 of the fuel cell 3, while the oxidant gas, which is preferably air, is fed to a cathode side 5 of the fuel cell 3. In the fuel cell 3, an electrolyte 6 separates the anode side 4 from the cathode side 5. The fuel cell 3 usually comprises of a stack of a plurality of fuel cell elements, in which the anode side 4 is separated from the cathode side 5 by an electrolyte 6. The fuel cell 3 is preferably a high-temperature fuel cell, which may be designed especially as a solid fuel cell or SOFC. It is also possible, in principle, to design the fuel cell 3 as a low-temperature fuel cell, which may be especially a PEM fuel cell, which operates with a proton transport membrane or with a polymer electrolyte membrane as the electrolyte 6. A CO removal means, not shown here, may be additionally provided between the fuel treatment device 2 and the fuel cell 3 for this case.

The fuel treatment device 2 is used to generate the burnable gas from a liquid fuel and from another component. This other component consists, as a rule, of ambient air, which is mixed with waste gas from the anode side 4 of the fuel cell 3 to form an oxidant gas to set a fuel-to-air ratio. The fuel is evaporated in a mixture formation space 7 and processed with the oxidant gas to form the most homogeneous reaction mixture possible. The reaction mixture is subsequently fed into a reformer 8, in which the reaction mixture is converted by means of a catalytic partial oxidation (CPDX) and/or a water gas shift reaction into a synthesis gas, in which mainly CO, $H_2$, $CO_2$, $N_2$ and $H_2O$ occur as reaction products. The synthesis gas is finally desulfurized in a desulfurization stage 9 before it is fed as burnable gas to the fuel cell 3 to produce electric current. However, it is also possible to transpose the order of the reformer 8 and desulfurization stage 9 and to desulfurize the reaction mixture before it is fed to the reformer 8. The synthesis gas produced in reformer 8 corresponds in this case to the burnable gas fed to the fuel cell 3.

The mixture formation space 7, reformer 8 and desulfurization stage 9 are preferably arranged adjoining each other in this order in a housing 10 along a longitudinal axis of housing 10, with the mixture formation space 7 being arranged on an inlet side 11 of housing 10, on which side the fuel is fed into housing 10. The reformer 8, which is adjoined by the desulfurization stage 9, may be arranged adjacent to the mixture formation space 7. As was mentioned above, the order in which the reformer 8 and the desulfurization stage 9 are arranged may optionally also be transposed. The reformer 8 or the desulfurization 9 stage is adjoined by the outlet side 12 of the housing 10, from which outlet side the burnable gas is fed to the fuel cell 3. The mixture formation space 7 is defined by the inlet-side wall of the housing 10 on the upstream front side and by an inlet area 13 of the reformer 8, which said inlet area is arranged at right angles to the longitudinal axis of the housing 10, the jacket surface of the mixture formation space 7 being formed by the housing wall.

A fuel, which is a liquid fuel containing atomic hydrogen, preferably a hydrocarbon, is fed to the mixture formation space 7. The fuel that is present in a motor vehicle equipped with the fuel cell system 1 anyway to operate an internal combustion engine of the vehicle, i.e., especially gasoline, diesel fuel or biodiesel, may be preferably used. The liquid fuel is fed to the mixture formation space 7 via a fuel lance 14 and evaporated in an evaporator mat 15, which may consist, for example, of a wire mesh. The evaporator mat 15 is preferably designed as a disk, which has the same cross section as the housing 10 and is arranged on the inlet side of the housing 10 essentially at right angles to the longitudinal axis of the housing 10. A mat heater 16, which is designed, for example, as a heating wire arranged helically in the principal plane of the evaporator mat 15, may be provided for evaporating the fuel. However, heat that is released by the reformer 8 or the desulfurization stage 9 by heat radiation or heat conduction to the evaporator mat 15 may also be used according to the present invention to evaporate the fuel. Since the evaporator mat 15 is arranged at right angles to the longitudinal axis of the housing 10, the main surface of the evaporator mat 15 is essentially parallel to the inlet area 13 of reformer 8, as a result of which good absorption of heat, which is radiated in the operating state or during a phase of regeneration of the fuel treatment device 2 from the inlet area 13 of reformer 8, is guaranteed. In addition, the evaporator mat 15 may absorb heat that is generated, for example, by heaters 17 arranged at the housing 10 or is generated in the reformer 8 or the desulfurization stage 9 and is sent by heat conduction in the wall of the housing 10 to the evaporator mat 15. The mixture formation space 7 has, furthermore, at least one recirculating line 18, with which ambient air as well as an anode waste gas recirculated from the anode side 4 of the fuel cell 3 can be fed to the mixture formation space 7. Since the partial oxidation of the fuel in the mixture formation space 7 takes place in a so-called "cold flame" reaction, a glow plug 19 for igniting the "cold flame" is provided, furthermore, to ignite the reaction mixture.

The reformer 8 is preferably designed as a carrier body made of ceramic or metal, which body is coated with a catalytic medium. The carrier body is designed such that a gas flowing through the carrier body comes into contact with the largest possible coated surface of the carrier body. Usual structures for such carrier bodies are known from waste gas cleaning, where, for example, carrier bodies made of ceramic with a honeycomb structure are used. Less common are carrier bodies made of metal, which have a corrugated structure. Such a corrugated structure may be assembled, for example, from a smooth film or plate and a corrugated film or plate to form a corrugated board-like structure and then rolled up into a cylinder. Furthermore, carrier bodies that are formed from a metal foam are known, and a coating may possibly be eliminated in such a case, because the metal used already represents a catalytic medium. All the above-mentioned structures are also suitable for use as carrier bodies for a reformer. Catalytic media such as nickel or precious metals, such as rhodium and palladium, are usually used in reformers for converting hydrocarbons into a synthesis gas.

Furthermore, a desulfurization stage 9 is provided according to the present invention for desulfurization by adsorptive desulfurization or selective adsorption from a gaseous phase. Adsorbents such as reduced metals, metal oxides, metal chlorides, activated carbons or zeolites may be used, in principle, for adsorptive desulfurization. Desulfurization of a liquid hydrocarbon is also possible, in principle, and the processes commonly used for this require very high pressures compared to adsorptive desulfurization. In addition, superimposed reactions, which prevent sufficient desulfurization, occur during desulfurization of biodiesel from the liquid state.

The desulfurization stage 9 likewise comprises according to the present invention a coated carrier body made of ceramic or metal, and the carrier body may have the same structures as the above-described carrier body for the reformer. A nickel-based adsorbent is provided according to the present invention for the coating. Compared to the zinc-based adsorbents frequently used in the state of the art, which have an operating temperature of about 300° C. up to about 400° C., nickel-based adsorbents can be used at temperatures of up to about 700° C.

Since the temperatures in the mixture formation space 7 equal about 400° C. following the area of the cold flame, the use of zinc-based adsorbents is readily possible there. Following the reformer 8, the temperatures do, however, equal about 700° C., so that cooling of the synthesis gas before entry into the desulfurization stage 9 is necessary when using zinc-based adsorbents following the reformer 8. The use of a nickel-based adsorbent is therefore intended according to the present invention, and it is therefore possible to use the desulfurization stage 9 both in front of and after the reformer 8 without further technical measures, for example, a cooling device. Furthermore, it was determined by investigations that higher hydrocarbons occurring in the reaction mixture, which may lead to damage to the fuel cell 3 due to "metal dusting," are decomposed by nickel-based adsorbents in the desulfurization stage, whereas this effect can be detected to a far lower extent only in case of zinc-based adsorbents.

A line 20, with which the burnable gas produced in the fuel treatment device 2 is fed to the anode side 4 of the fuel cell 3, is provided on the outlet side 12 of housing 10. Furthermore, a storage means 21 is provided at the recirculation line 18 to store a gas mixture of anode waste gases or other, preferably inert gases in order to make it possible to control the fuel-to-air ratio in the mixture formation space 7 if needed, for example, in case of a regeneration operation of the fuel treatment device 2.

The operating temperatures or the activation temperature of the individual assembly units is far above the outside temperatures at approximately 350° C. to 950° C. When putting into operation a fuel treatment device 2 cooled to ambient temperature, it is therefore necessary to heat the individual assembly units to the necessary temperature. This can be carried out, on the one hand, with preheaters usually used in the state of the art, which burn, in general, a fuel to generate heat. Furthermore, the use of electrically operated heaters is possible.

A further possibility is provided according to the present invention for preheating the individual components in case of the above-described use of a carrier body made of metal and possibly of a housing 10 made of metal. By applying an electric current to the housing 10 or to the carrier body, the assembly units can be heated by the electric resistance of the housing 10 or of the carrier body. Thus, there is a very cost-effective possibility for preheating the assembly units, which can be embodied in a very simple manner, without increasing the size or the weight of the fuel treatment device 2.

The desulfurization stage 9 is not provided according to the present invention as a replaceable assembly unit, which must be replaced, as is common in the state of the art, as soon as the adsorption capacity of the absorbent for sulfur is reached. By contrast, a regeneration process of the desulfurization stage 9, in which adsorbed sulfur is again removed from the desulfurization stage 9 and removed from the fuel cell system 1, is provided in the desulfurization stage 9 according to the present invention. An oxygen-containing gas, e.g., a mixture of air and anode waste gas or the gas mixture can be fed for this to the fuel treatment device 2 in a state in which no burnable gas is generated for the fuel cell 3. The oxygen reacts in a highly exothermal reaction with a sulfur bound to the adsorbents to form $SO_2$, which can be removed via line 20 to the fuel cell 3 or via waste gas lines.

A very large amount of heat is generated by the exothermal reaction during the regeneration process, as a result of which the desulfurization stage 9 is intensely heated. Thus, additional assembly units can be heated via direct heat conduction via mutually adjacent areas of the assembly units during the regeneration of the desulfurization 9 in a fuel treatment device 2 cooled to ambient temperature. Furthermore, transfer of heat between individual assembly units over the wall of the housing accommodating all assembly units is possible, or transfer of heat between individual assembly units by heat radiation is possible. The individual assembly units and especially the reformer 8 as well as the mixture formation space 7 and the evaporator mat 15 can thus be preheated by means of the heat generated during the exothermal regeneration reaction to their working temperature during the regeneration of the desulfurization stage 9 before the start of the production of burnable gas by the fuel treatment device 2 without external heaters being needed herefor. Regeneration of the desulfurization stage 9 following the generation of burnable gas by the fuel treatment device 2 is also possible, in principle, e.g., in order to reach the highest possible adsorption capacity of the adsorbent before a repeated generation of burnable gas. Furthermore, regeneration of the desulfurization stage 9 is also possible during the generation of burnable gas by the fuel treatment device 2. The output of the reformer 8 must be reduced for this or the fuel supply must be reduced and the amount of recirculated anode waste gas must be increased. By increasing the quantity of anode waste gas, the percentage of water vapor increases in the mixture formation space 7 and the chemical reactions taking place are shifted from the exothermal catalytic partial oxidation (CPDX) to the endothermal water gas shift reaction. As a consequence, cooling of the system takes place, as a result of which the percentage of air that can be fed is increased. To regenerate the desulfurization stage 9, the fuel-to-air ratio can be changed to the extent that there is a slight oxygen excess during the entry of the synthesis gas into the desulfurization stage 9. The excess oxygen fully reacts, as described above, with the bound sulfur in the desulfurization stage 9, as a result of which regeneration of the desulfurization stage 9 is possible during the ongoing operation of the fuel treatment device 2 without the fuel cell 3 being damaged by the supply of oxygen to the anode side 4.

Figure 2:
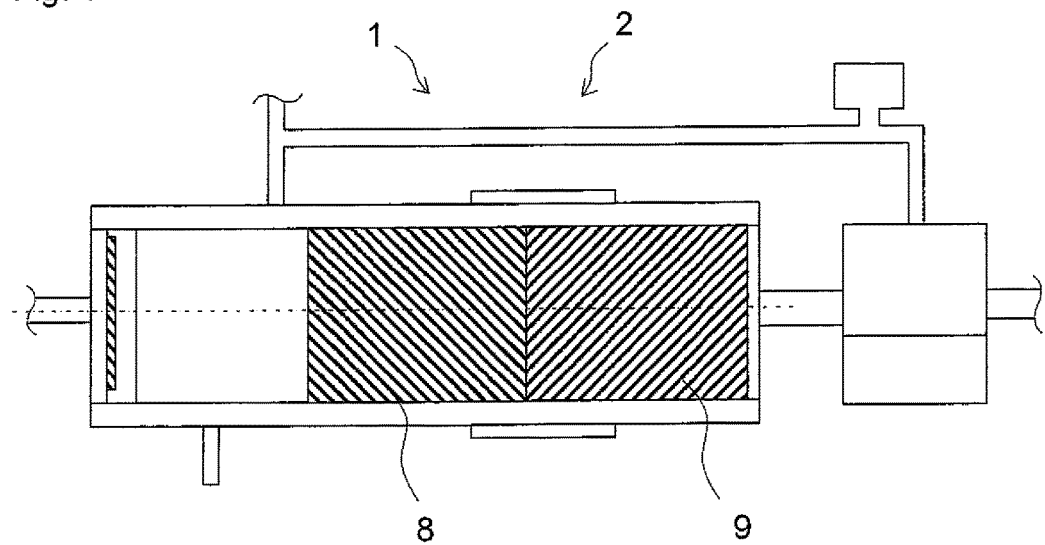
FIG. 2 is a schematic view of a second embodiment of a fuel cell system with a fuel treatment device and with a fuel cell.

FIG. 2 shows another embodiment of the present invention, which is based on the embodiment described in FIG. 1. Features that correspond to the first embodiment will not be described once again below or will be provided with different reference numbers.

The reformer 8 and the desulfurization stage (desulfurization device) 9 of the fuel treatment device 2 are described as respective individual assembly units in the above-described first exemplary embodiment. However, it is also possible to combine the two assembly units into a single one. A carrier body may be coated for this purpose with two different materials, which consist of a catalytic medium commonly used in reformers to convert hydrocarbons into a synthesis gas in one case and of an adsorbent commonly used for the adsorptive desulfurization in the other case. The coating is to be applied such that a first longitudinal section is coated with one material on one side of the carrier body over the entire cross-sectional area thereof and a second longitudinal section is coated with the other material over the entire cross-sectional area thereof. It is conceivable to dip for this purpose the carrier body with one side into a first dipping bath containing a catalytic medium to a certain depth to coat the first longitudinal section. To coat the second longitudinal section, the carrier body is to be dipped with the opposite side into a second dipping bath containing an adsorbent such that the two coated areas do not overlap.

Figure 3:
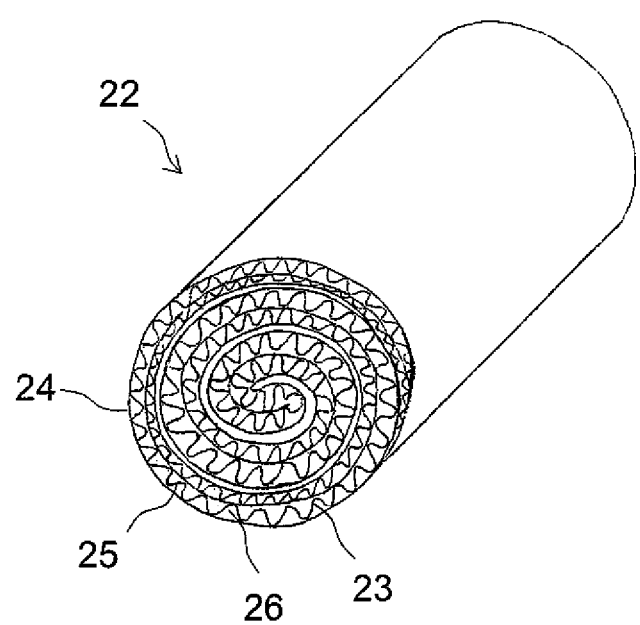
FIG. 3 is a schematic sectional view of a carrier body with a corrugated structure.

FIG. 3 shows a schematic sectional view of a carrier body 22 consisting of metal, which has a corrugated structure 23. The carrier body is built up from a smooth film 24 and a corrugated film 25, which are assembled into a corrugated board-like structure. The corrugated film 25 applied to the smooth film 24 thus has a corrugated structure 23. The two films are rolled up, furthermore, into a cylinder, as a result of which a tubular structure is obtained, in the interior of which a plurality of small ducts 26 are formed due to the corrugated structure 23 of the corrugated film 24. A large coated surface, with which gas flowing through the ducts 26 comes into contact, is thus obtained by coating the films with a catalytic medium or an adsorbent.

Even though certain elements, embodiments and applications of the present invention are shown and described, it is obvious that the present invention is not limited to these and the person skilled in the art can make modifications without going beyond the scope of the present disclosure, especially concerning the above teaching.

While specific embodiments of the invention have been shown and described in detail to illustrate the application of the principles of the invention, it will be understood that the invention may be embodied otherwise without departing from such principles.

The invention claimed is:

1. A fuel treatment device for converting a hydrocarbon-containing fuel into a fuel for a fuel cell, the fuel treatment device comprising:
    a housing comprising a housing cross section geometry, a single housing interior space and only a single housing fluid outlet, the single housing interior space receiving a flow of fluid;
    a mixture formation space for forming and processing a mixture of fuel and another component;
    a reformer for converting the mixture into a synthesis gas; and
    a desulfurization stage for removing sulfur from the synthesis gas or from the mixture, the mixture formation space, the reformer and the desulfurization stage being arranged in the housing interior space, wherein the reformer and the desulfurization stage are arranged flow adjacent to each other in the single housing interior space in a direction of the flow of fluid along a longitudinal axis of the housing, the reformer and the desulfurization stage having the same cross-sectional geometry, wherein the cross-sectional geometry of the reformer and the desulfurization stage is the same as the housing cross section geometry, the desulfurization stage being located adjacent to the single housing fluid outlet, wherein the flow of fluid is delivered directly from the desulfurization stage to the fuel cell.

2. A fuel treatment device in accordance with claim 1, wherein the reformer and/or the desulfurization stage comprises a coated carrier body, the coated carrier body comprising a tubular structure, the tubular structure comprising a smooth film and a corrugated film, the smooth film being in contact with the corrugated film.

3. A fuel treatment device in accordance with claim 1, wherein the reformer and the desulfurization stage are integrated in a one-piece unit, the desulfurization stage being arranged downstream of the reformer with respect to the direction of the flow of the fluid.

4. A fuel treatment device in accordance with claim 1, wherein the mixture formation space is arranged adjacent to the reformer or the desulfurization stage in the housing along a longitudinal axis of housing.

5. A fuel treatment device in accordance with claim 1, wherein the reformer and/or the desulfurization stage comprises a coated metal carrier body.

6. A fuel treatment device in accordance with claim 1, wherein the reformer and/or the desulfurization stage has a coated metal carrier body with a corrugated structure.

7. A fuel treatment device in accordance with claim 1, wherein the reformer and/or the desulfurization stage comprises a coated metal carrier body made of metal foam.

8. A fuel treatment device in accordance with claim 1, further comprising an electric heater, wherein the mixture formation space and/or the reformer and/or the desulfurization stage are operatively connected to the electric heater.

9. A fuel treatment device in accordance with claim 1, wherein the desulfurization stage has an adsorbent for the removal of sulfur from the synthesis gas by adsorptive desulfurization.

10. A fuel cell system in a motor vehicle, the fuel cell comprising:
    a fuel cell; and
    a fuel treatment device comprising:
        a housing comprising a housing interior space, a fuel inlet and only one fluid outlet;
        a mixture formation space for forming and processing a mixture of fuel and another component;
        a reformer for converting the mixture into a synthesis gas; and
        a desulfurization stage for removing sulfur from the synthesis gas or from the mixture, the desulfurization stage being arranged directly adjacent to the one fluid outlet, the mixture formation space, the housing and the reformer being arranged in the housing interior space between the fuel inlet and the fluid outlet, wherein the reformer and the desulfurization stage step are arranged flow adjacent to each other in a flow path of fluid in the housing along a longitudinal axis of the housing, wherein fuel generated by the fuel treatment device is fed as anode gas from the desulfurization stage directly to the fuel cell for generating electric current.

11. A fuel cell system in accordance with claim 10, wherein the desulfurization stage receives a flow of the synthesis gas or the mixture directly from the reformer, the desulfurization stage having an adsorbent for the removal of sulfur from the synthesis gas by adsorptive desulfurization, the adsorbent comprising nickel, the mixture formation space being arranged flow adjacent to one of the reformer and the desulfurization stage along the longitudinal axis of the housing, wherein one of the reformer and the desulfurization stage defines a portion of the mixture formation space.

12. A fuel cell system in accordance with claim 10, wherein the fuel treatment device comprises a regeneration state, the desulfurization stage receiving a flow of fluid with the fuel treatment in the regeneration state, the flow of fluid comprising oxygen, the oxygen reacting with sulfur in the desulfurziation stage to form a reacted flow of fluid, the reacted flow of fluid comprising $SO_2$, the desulfurization stage comprising an outlet, wherein the reacted flow of fluid exits the desulfurization stage via the outlet, the outlet being in fluid communication with the only one fluid outlet of the housing, the desulfurization stage being arranged downstream of the reformer with respect to a direction of the flow of fluid.

13. A fuel cell system in accordance with claim 12, wherein no burnable gas is generated for the fuel cell when the fuel treatment device is in the regeneration state.

14. A fuel cell system in accordance with claim 12, further comprising:
    a recirculating line connected to the fuel treatment device and the fuel cell, the desulfurization stage receiving the flow of fluid via at least the recirculating line.

15. A fuel cell system in accordance with claim 10, further comprising:
 a recirculating line, the fuel cell generating anode waste gas, the mixture formation space receiving the anode waste gas via the recirculating line.

16. A fuel treatment device in accordance with claim 1, wherein the desulfurization stage has an adsorbent for the removal of sulfur from the synthesis gas by adsorptive desulfurization, the adsorbent comprising nickel, the desulfurization stage receiving a flow of the synthesis gas or the mixture directly from the reformer, the mixture formation space being arranged flow adjacent to one of the reformer and the desulfurization stage along the longitudinal axis of the housing, wherein one of the reformer and the desulfurization stage defines a portion of the mixture formation space.

17. A fuel treatment device in accordance with claim 1, wherein the fuel treatment device comprises a regeneration state, the desulfurization stage receiving a flow of fluid with the fuel treatment in the regeneration state, the desulfurization stage comprising an outlet, the flow of fluid comprising oxygen, the oxygen reacting with sulfur in the desulfurziation stage to form a sulfurized flow of fluid, the sulfurized flow of fluid comprising $SO_2$, wherein the sulfurized flow of fluid exits the desulfurization stage via the outlet.

18. A fuel treatment device for converting a hydrocarbon-containing fuel into a fuel for a fuel cell, the fuel treatment device comprising:
 a housing comprising a fluid inlet, only one fluid outlet, a housing longitudinal axis and a single housing interior space, the housing interior space comprising a mixture formation space, the mixture formation space receiving fluid via the fluid inlet, the fluid comprising fuel;
 a reformer for converting the fluid into a synthesis gas; and
 a desulfurization stage for removing sulfur from the synthesis gas or from the fluid, the reformer and the desulfurization stage being arranged in the housing interior space, the housing and one of the reformer and the desulfurization defining a portion of the mixture formation space, wherein the reformer and the desulfurization stage are arranged flow adjacent to each other in a direction of a flow of the fluid in the housing along the housing longitudinal axis, wherein the reformer and the desulfurization stage are arranged between the fluid inlet and the fluid outlet, the desulfurization stage being arranged directly adjacent the one fluid outlet, wherein the fluid is delivered directly from the desulfurization stage to the fuel cell.

19. A fuel treatment device in accordance with claim 18, wherein the desulfurization stage has an adsorbent for the removal of sulfur from the synthesis gas by adsorptive desulfurization, the adsorbent comprising nickel, the desulfurization stage receiving a flow of the synthesis gas or the fluid directly from the reformer.

20. A fuel treatment device in accordance with claim 18, wherein the reformer is arranged upstream of the desulfurization stage with respect to the direction of the flow of fluid.

* * * * *